United States Patent
Huang et al.

(10) Patent No.: US 12,547,415 B2
(45) Date of Patent: Feb. 10, 2026

(54) MICROCONTROLLER CIRCUIT AND BOOT CONTROL METHOD

(71) Applicant: Nuvoton Technology Corporation, Hsinchu Science Park (TW)

(72) Inventors: Chun-Hao Huang, Hsinchu (TW); Tzu-Lan Shen, Taoyuan (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 57 days.

(21) Appl. No.: 18/443,498

(22) Filed: Feb. 16, 2024

(65) Prior Publication Data

US 2024/0345845 A1 Oct. 17, 2024

(30) Foreign Application Priority Data

Apr. 11, 2023 (TW) .................................. 112113423

(51) Int. Cl.
*G06F 9/4401* (2018.01)
(52) U.S. Cl.
CPC .................. *G06F 9/4403* (2013.01)
(58) Field of Classification Search
CPC ...... G06F 9/4403; G06F 9/445; G06F 21/575; G06F 21/572
USPC .......................................................... 713/2
See application file for complete search history.

(56) References Cited

U.S. PATENT DOCUMENTS

| | | | |
|---|---|---|---|
| 8,543,801 B2* | 9/2013 | Chu ..................... | G06F 11/1417 714/6.32 |
| 9,563,497 B2* | 2/2017 | Dasari ................. | G06F 11/0793 |
| 11,216,597 B2* | 1/2022 | Alon ..................... | G06F 21/575 |
| 11,347,519 B2* | 5/2022 | Nelson .................. | G06F 21/572 |
| 2004/0068334 A1* | 4/2004 | Tsai .......................... | G06F 8/65 700/89 |

(Continued)

FOREIGN PATENT DOCUMENTS

| | | |
|---|---|---|
| CN | 112929512 A | 6/2021 |
| TW | 202044027 A | 12/2020 |

(Continued)

OTHER PUBLICATIONS

Taiwan Office Action dated May 31, 2024 in Application No. 112113423 is attached, 7 pages.

*Primary Examiner* — Brian T Misiura
(74) *Attorney, Agent, or Firm* — MUNCY, GEISSLER, OLDS & LOWE, P.C.

(57) ABSTRACT

A microcontroller circuit is provided. The microcontroller circuit includes a memory, a check module, and a processor. The memory includes a main memory block and a backup memory block. The main memory block has a boot setting and the backup memory block has a backup boot setting. The check module includes a register. The processor is configured to determine whether the backup memory block of the memory has been backed up according to the register of the check module in response to a boot signal, and to compare the boot setting with the backup boot setting when the backup memory block of the memory has been backed up. When the boot setting is different from the backup boot setting, the processor is configured to perform a boot initialization procedure according to the backup boot setting.

20 Claims, 4 Drawing Sheets

(56) References Cited

U.S. PATENT DOCUMENTS

| | | | | |
|---|---|---|---|---|
| 2004/0193865 | A1* | 9/2004 | Nguyen | G06F 9/4401 |
| | | | | 713/2 |
| 2012/0239920 | A1* | 9/2012 | Yang | G06F 8/65 |
| | | | | 713/2 |
| 2014/0040605 | A1* | 2/2014 | Futral | G06F 9/445 |
| | | | | 713/2 |
| 2017/0344302 | A1* | 11/2017 | Blicharski | G06F 3/0625 |
| 2020/0073652 | A1* | 3/2020 | Chen | G06F 9/4403 |
| 2024/0095178 | A1* | 3/2024 | Cheng | G06F 12/10 |

FOREIGN PATENT DOCUMENTS

| | | |
|---|---|---|
| TW | I715925 B | 1/2021 |
| TW | I768316 B | 6/2022 |
| TW | I789142 B | 1/2023 |

* cited by examiner

MICROCONTROLLER CIRCUIT AND BOOT CONTROL METHOD

CROSS REFERENCE TO RELATED APPLICATIONS

This application claims priority of Taiwan Patent Application No. 112113423, filed on Apr. 11, 2023, the entirety of which is incorporated by reference herein.

BACKGROUND OF THE INVENTION

Field of the Invention

The present invention relates to microcontroller circuits, and, in particular, to microcontroller circuits with backup check and restoration of boot settings.

Description of the Related Art

In an electronic device or system, a microcontroller (MCU) has boot settings stored in a flash memory. When rewriting the boot settings, the content of the boot settings in the flash memory must first be cleared so that the new boot settings can be written in, and it is these settings that will be used in the next boot-up procedure.

When rewriting the boot settings, if the microcontroller shuts down abnormally and cannot complete the write-in of the new boot settings, this may cause the boot settings to be abnormal. In addition, if the new boot settings are not written correctly, the microcontroller will operate abnormally due to the wrong settings when the system is restarted, thereby causing unexpected damage to the electronic device or system.

BRIEF SUMMARY OF THE INVENTION

An embodiment of the present invention provides a microcontroller circuit. The microcontroller circuit includes a memory, a check module, and a processor. The memory includes a main memory block and a backup memory block. The main memory block has a boot setting and the backup memory block has a backup boot setting. The check module includes a register. The processor is configured to determine whether the backup memory block of the memory has been backed up according to the register of the check module in response to a boot signal, and to compare the boot setting with the backup boot setting when the backup memory block of the memory has been backed up. When the boot setting is different from the backup boot setting, the processor is configured to perform a boot initialization procedure according to the backup boot setting.

Furthermore, an embodiment of the present invention provides a boot control method. In response to a boot signal, it is determined whether a flag of a check module is set. When the flag is set, it is determined whether a boot setting in a main memory block of a memory is the same as a backup boot setting in a backup memory block of the memory. A boot initialization procedure is performed according to the backup boot setting when the boot setting is different from the backup boot setting.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
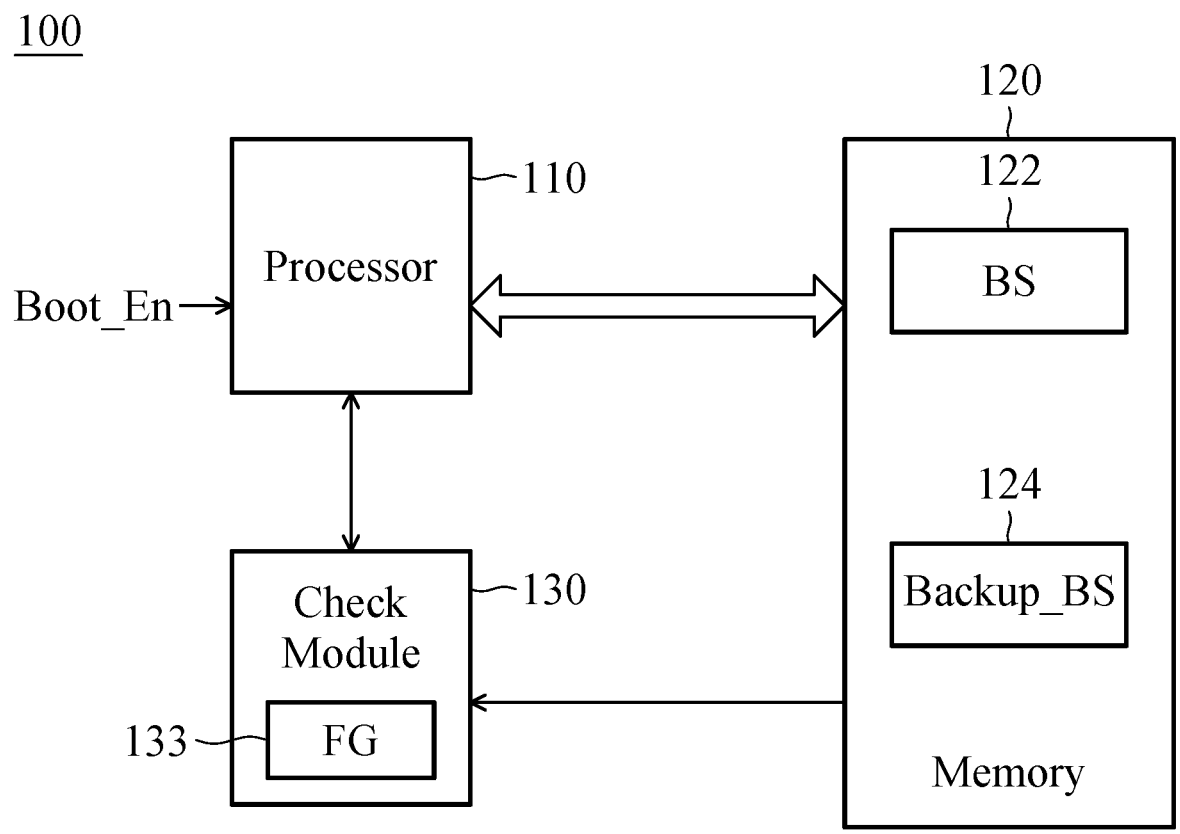
FIG. 1 shows a microcontroller circuit according to some embodiments of the invention.

FIG. 1 shows a microcontroller circuit 100 according to some embodiments of the invention. The microcontroller circuit 100 includes a processor 110, a memory 120 and a check module 130. The microcontroller circuit 100 is implemented in an integrated circuit (IC) and disposed in an electronic device or system (not shown). In some embodiments, the processor 110 may be a central processing unit (CPU). When the power of the electronic device or system is powered on or reset (such as system power on reset (POR), software reset and so on), the processor 110 is configured to perform a boot procedure in response to a boot signal Boot_En. In the microcontroller circuit 100, the memory 120 may be a non-volatile memory. In some embodiments, the memory 120 may be a flash memory. For simplicity of illustration, other circuits or components within the microcontroller circuit 100 are omitted in FIG. 1.

The memory 120 includes multiple memory blocks, and the processor 110 can erase (or clear) each memory block separately. In the memory 120, the main memory block 122 is used for storing the boot setting BS, and the backup memory block 124 is used for storing the backup boot setting Backup_BS. Before rewriting the boot setting BS in the main memory block 122, the memory 120 is configured to perform a backup procedure, to store the new boot setting New_BS to be written into the main memory block 122, in the backup memory block 124, i.e., the backup boot setting Backup_BS in the backup memory block 124 is equal to the new boot setting New_BS (i.e., Backup_BS=New_BS). After completing the backup procedure, the processor 110 is configured to write the new boot setting New_BS into the main memory block 122, i.e., the boot setting BS in the main memory block 122 is equal to the new boot setting New_BS (i.e., BS=New_BS).

The check module 130 includes a register 133. When performing the backup procedure, the processor 110 is configured to firstly erase the backup memory block 124 of the memory 120 and notify the check module 130, so as to clear the flag FG in the register 133, such as disabling the flag FG or setting the flag FG to the first logic level. After the backup procedure is completed, the memory 120 is configured to notify the check module 130, so as to set the flag FG in the register 133, for example, enabling the flag FG or setting the flag to the second logic level. Therefore, the processor 110 is configured to determine whether the backup procedure is completed according to the state of the flag FG in the register 133. In some embodiments, after writing the new boot setting New_BS into the backup memory block 124 by the processor 110, the processor 110 is further configured to notify the check module 130, so as to set the flag FG in the register 133.

Figure 2:
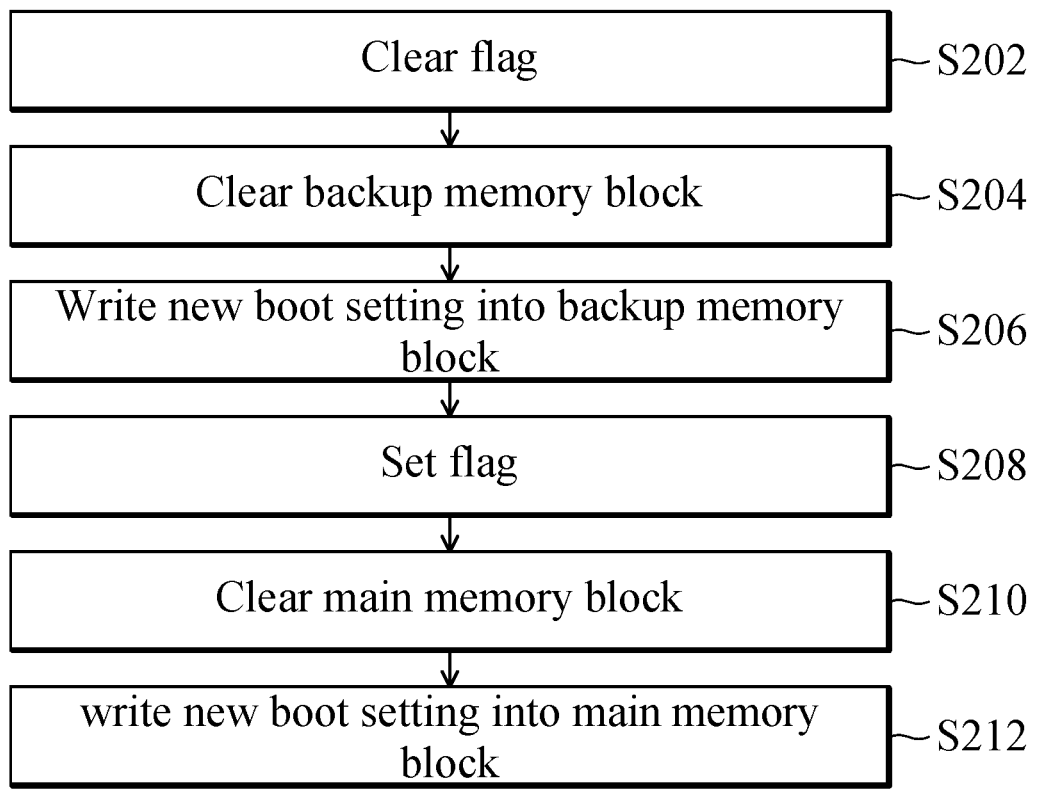
FIG. 2 shows a boot setting method according to some embodiments of the invention.

FIG. 2 shows a boot setting method 200 according to some embodiments of the invention. The boot setting method 200 of FIG. 2 is applicable to the microcontroller circuit 100 of FIG. 1. Referring to FIG. 1 and FIG. 2 together, firstly, in step S202, the processor 110 is configured to clear the flag FG of the register 133 in the check module 130. For example, the processor 110 is configured to notify the check module 130, so as to disable the flag FG or set the flag FG to the first logic level. Next, in step S204, the processor 110 is configured to clear (or erase) the backup memory block 124 in the memory 120. Next, in step S206, the processor 110 is configured to write the new boot setting New_BS into the backup memory block 124. Thus, the backup boot setting Backup_BS in the backup memory block 124 is updated as the new boot setting New_BS (i.e., Backup_BS=New_BS). Next, in step S208, the memory 120 is configured to notify the check module 130, so as to set the flag FG of the register 133, such as enabling the flag FG or setting the flag FG to the second logic level. Thus, the processor 110 completes the backup procedure of the new boot setting New_BS, and stores the new boot setting New_BS in the backup memory block 124.

In step S210, after completing the backup procedure, the processor 110 is configured to clear (or erase) the main memory block 122 in the memory 120. Next, in step S212, the processor 110 is configured to write the new boot setting New_BS into the main memory block 122. Thus, the boot setting BS in the main memory block 122 is updated as the new boot setting New_BS (i.e., BS=New_BS), which will be used when the boot procedure is performed next time.

Figure 3:
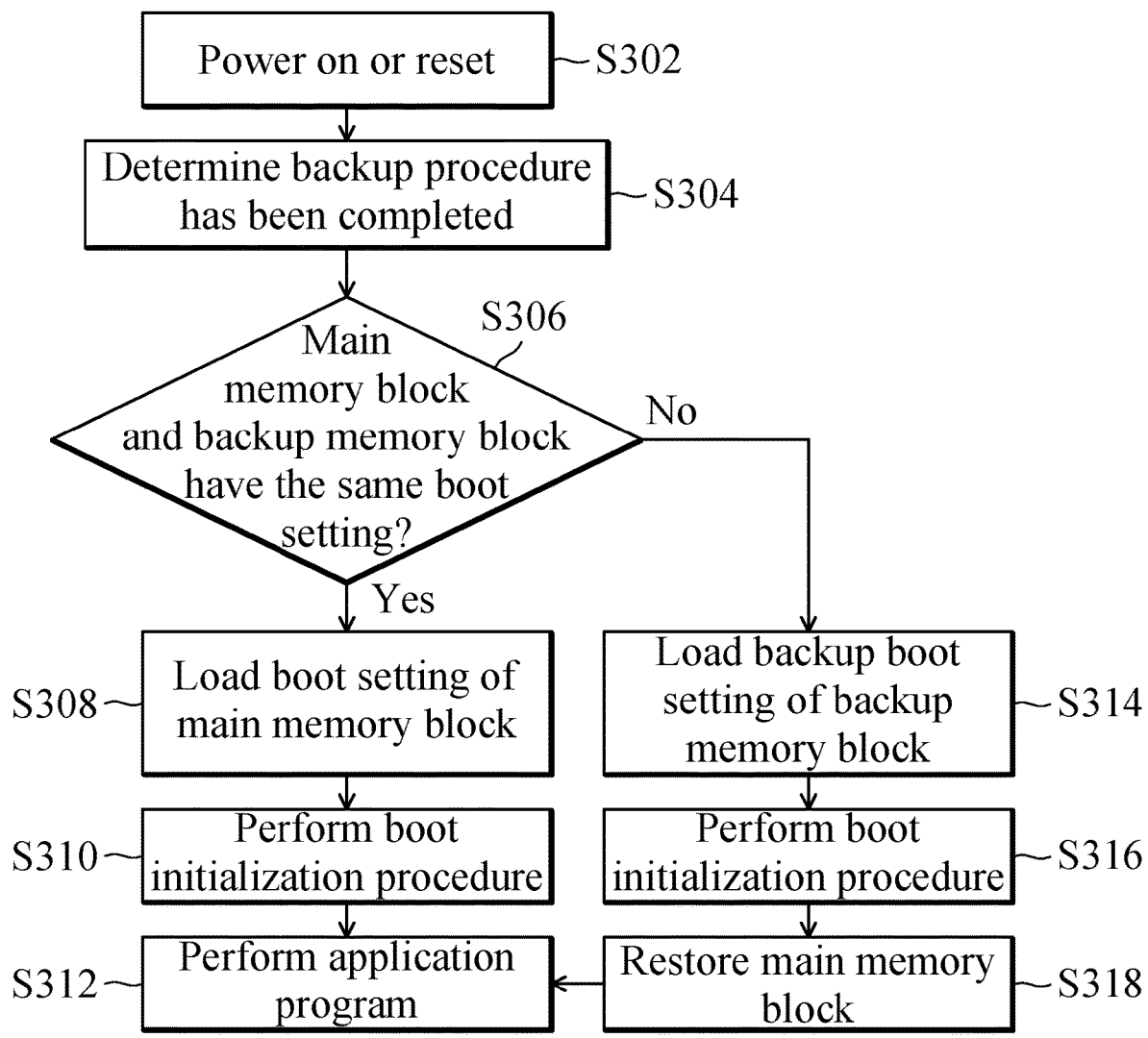
FIG. 3 shows a boot control method according to some embodiments of the invention.

FIG. 3 shows a boot control method 300 according to some embodiments of the invention. The boot control method 300 of FIG. 3 is applicable to the microcontroller circuit 100 of FIG. 1. Referring to FIG. 1 and FIG. 3 together, in step S302, when the power of the electronic device or system is powered on or reset, the processor 110 is configured to receive the boot signal Boot_En, and determine the state of the flag FG (e.g., whether the flag FG is set or cleared) in the register 133 of the check module 130 in response to the boot signal Boot_En. In step S304, according to the flag FG set in the register 133 of the check module 130, the processor 110 is configured to determine that the backup procedure of the previous new boot setting New_BS has been completed. Next, the processor 110 is configured to access the memory 120 to read the boot setting BS in the main memory block 122 and the backup boot setting Backup_BS in the backup memory block 124. In step S306, the processor 110 is configured to determine whether the boot setting BS is the same as the backup boot setting Backup_BS. If the boot setting BS is the same as the backup boot setting Backup_BS (i.e., BS=Backup_BS), it is determined that the processor 110 did not have abnormal conditions when rewriting the boot settings previously, e.g., no abnormal shutdown occurred. Next, the processor 110 is configured to load the boot setting BS and related content in the main memory block 122 to the corresponding components in the electronic device or system (step S308), so as to perform the boot initialization procedure according to the boot setting BS (step S310). After completing the boot initialization procedure, the electronic device or system is configured to perform its application programs (step S312).

Referring back to step S306, if the boot setting BS is different from the backup boot setting Backup_BS (i.e., BS/Backup_BS), it is determined that an abnormal situation occurred when the processor 110 rewritten the boot setting, e.g., the microcontroller circuit 100 is shut down abnormally. Next, the processor 110 is configured to load the backup boot setting Backup_BS and related content of the backup memory block 124 to the corresponding components in the electronic device or system (step S314), so as to perform the boot initialization procedure according to the backup boot setting Backup_BS (step S316). After completing the boot initialization procedure, the processor 110 is configured to restore the boot setting BS of the main memory block 122 (step S318). For example, the processor 110 is configured to write the backup boot setting Backup_BS of the backup memory block 124 into the main memory block 122, so that the boot setting BS is updated as the backup boot setting Backup_BS (i.e., BS=Backup_BS). Thus, the boot setting BS of the main memory block 122 has been rewritten to the correct boot setting. Next, after restoration of the main memory block 122 is completed, the electronic device or system is configured to perform its application programs (step S312).

Figure 4:
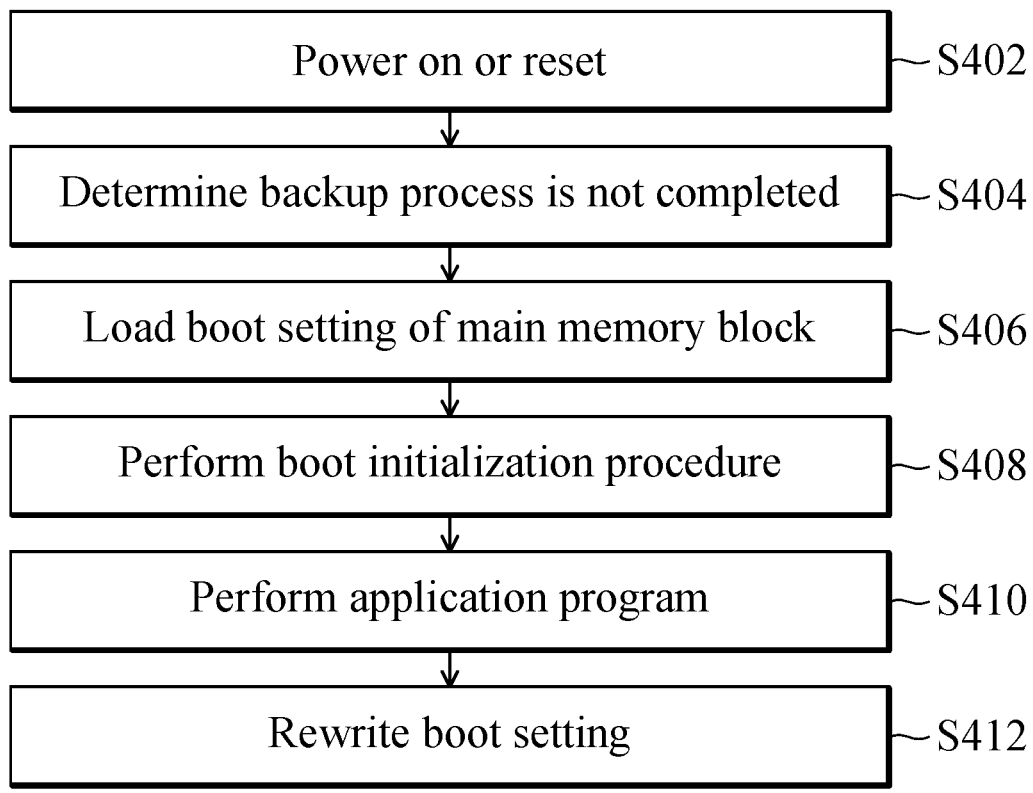
FIG. 4 shows a boot control method according to some embodiments of the invention.

FIG. 4 shows a boot control method 400 according to some embodiments of the invention. The boot control method 400 of FIG. 4 is applicable to the microcontroller circuit 100 of FIG. 1. Referring to FIG. 1 and FIG. 4 together, in step S402, when the power of the electronic device or system is powered on or reset, the processor 110 is configured to receive the boot signal Boot_En, and to determine the state of the flag FG (e.g., whether the flag FG is set or cleared) in the register 133 of the check module 130 in response to the boot signal Boot_En. In step S404, according to the cleared flag FG in the register 133 of the check module 130, the processor 110 is configured to determine that the previous backup process of the new boot setting New_BS is not completed. Next, the processor 110 is configured to load the boot setting BS and related content in the main memory block 122 to the corresponding components in the electronic device or system (step S406), so as to perform the boot initialization procedure according to the boot setting BS (step S408). After completing the boot initialization procedure, the electronic device or system is configured to perform its application programs (step S410). Next, the processor 110 is configured to re-perform the boot setting method 200 of FIG. 2 (step S412), so as to write the new boot setting New_BS into the backup memory block 124 and the main memory block 122 in sequence. As described above, after the processor 110 writes the new boot setting New_BS into the backup memory block 124, the memory 120 or the processor 110 is configured to notify the check module 130, so as to set the flag FG of the register 133.

When the electronic device or system is abnormally shut down and then restarted in any stage of rewriting the boot settings, according to the state of the flag FG in the inspection module 130 and the content of the boot setting BS and the backup boot setting Backup_BS in the memory 120, the processor 110 can correctly complete the boot procedure, and load the normal boot settings into the electronic device or system.

In the embodiments of the invention, by using the check module 130, the processor 110 is configured to determine whether the backup procedure of the boot settings is completed previously according to the state of the flag FG, and compare whether the boot setting BS is the same as the backup boot setting Backup_BS, to perform the corresponding boot procedure. According to the boot control method described in the embodiments, the processor 110 is configured to perform the self-correction function of the boot setting according to the backup situation, and can confirm the error and restore the system to the normal state when an error occurs. Compared with the traditional boot setting writing abnormality and the electronic device or system use the wrong boot setting to start up, the processor 110 can rewrite the boot setting, so that the electronic device or system can be restored to the state before the error.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A microcontroller circuit, comprising:
    a memory, comprising a main memory block and a backup memory block, wherein the main memory block has a boot setting and the backup memory block has a backup boot setting;
    a check module, comprising a register; and
    a processor configured to determine whether the backup memory block of the memory has been backed up according to the register of the check module in response to a boot signal, and to compare the boot setting with the backup boot setting when the backup memory block of the memory has been backed up,
    wherein when the boot setting is different from the backup boot setting, the processor is configured to perform a boot initialization procedure according to the backup boot setting.

2. The microcontroller circuit as claimed in claim 1, wherein after performing the boot initialization procedure, the processor is configured to write the backup boot setting into the main memory block of the memory to restore the boot setting.

3. The microcontroller circuit as claimed in claim 1, wherein when the boot setting is the same as the backup boot setting, the processor is configured to perform the boot initialization procedure according to the boot setting.

4. The microcontroller circuit as claimed in claim 1, wherein when the backup memory block of the memory has not been backed up, the processor is configured to perform the boot initialization procedure according to the boot setting.

5. The microcontroller circuit as claimed in claim 1, wherein before the processor writes a new boot setting into the main memory block of the memory, the processor is configured to write the new boot setting into the backup memory block of the memory as the backup boot setting.

6. The microcontroller circuit as claimed in claim 5, wherein before writing the new boot setting into the backup memory block of the memory, the processor is configured to clear a flag of the register in the check module, and to clear the backup memory block in the memory.

7. The microcontroller circuit as claimed in claim 6, wherein after writing the new boot setting into the backup memory block of the memory, the processor is configured to set the flag of the register in the check module.

8. The microcontroller circuit as claimed in claim 1, wherein when a flag of the register in the check module is set, the processor is configured to determine that the backup memory block of the memory has been backed up.

9. The microcontroller circuit as claimed in claim 8, wherein when the flag of the register in the check module is cleared, the processor is configured to determine that the backup memory block of the memory has not been backed up.

10. The microcontroller circuit as claimed in claim 8, wherein the memory is a flash memory.

11. A boot control method, comprising:
    in response to a boot signal, determining whether a flag of a check module is set;
    determining whether a boot setting in a main memory block of a memory is the same as a backup boot setting in a backup memory block of the memory when the flag is set; and
    performing a boot initialization procedure according to the backup boot setting when the boot setting is different from the backup boot setting.

12. The boot control method as claimed in claim 11, further comprising:
    writing the backup boot setting into the main memory block of the memory after performing the boot initialization procedure, so as to restore the boot setting.

13. The boot control method as claimed in claim 11, further comprising:
    performing the boot initialization procedure according to the boot setting when the boot setting is the same as the backup boot setting.

14. The boot control method as claimed in claim 11, further comprising:
    performing the boot initialization procedure according to the boot setting when the flag is not set.

15. The boot control method as claimed in claim 11, further comprising:
    writing a new boot setting into the backup memory block of the memory as the backup boot setting before writing the new boot setting into the main memory block of the memory.

16. The boot control method as claimed in claim 15, further comprising:
    clearing the flag of the check module and clearing the backup memory block of the memory before writing the new boot setting into the backup memory block of the memory.

17. The boot control method as claimed in claim 16, further comprising:
    setting the flag of the check module after the new boot setting is written into the backup memory block of the memory.

18. The boot control method as claimed in claim 17, further comprising:
    writing the new boot setting into the main memory block of the memory after setting the flag of the check module.

19. The boot control method as claimed in claim 11, wherein in response to the boot signal, determining whether the flag of the check module is set further comprises:
    determining that the backup memory block of the memory has been backed up when the flag is set; and
    determining that the backup memory block of the memory has not been backed up when the flag is not set.

20. The boot control method as claimed in claim 11, wherein the memory is a flash memory.

* * * * *